(12) United States Patent
Nakamura

(10) Patent No.: US 7,100,955 B2
(45) Date of Patent: Sep. 5, 2006

(54) GENERAL PURPOSE HAND FOR MULTIAXIS MANIPULATOR

(75) Inventor: Setsuo Nakamura, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 178 days.

(21) Appl. No.: 10/643,938

(22) Filed: Aug. 20, 2003

(65) Prior Publication Data
US 2004/0041422 A1 Mar. 4, 2004

(30) Foreign Application Priority Data
Sep. 3, 2002 (JP) ............................. 2002-257511

(51) Int. Cl.
*A47B 97/00* (2006.01)
(52) U.S. Cl. ....................... 294/65; 294/64.1
(58) Field of Classification Search ................. 294/65, 294/64.1; 414/627, 737; 74/18.2, 490.01, 74/490.06, 567; 269/21; 188/67
See application file for complete search history.

(56) References Cited

U.S. PATENT DOCUMENTS 5,005,277 A * 4/1991 Uemura et al. .......... 29/407.04
5,123,161 A * 6/1992 Kubo et al. ................... 29/784
5,590,870 A 1/1997 Goellner
6,722,842 B1 * 4/2004 Sawdon et al. ............. 414/729
6,863,323 B1 * 3/2005 Neveu ......................... 294/65

FOREIGN PATENT DOCUMENTS

DE 101 21 344 A1 11/2002

OTHER PUBLICATIONS

Patent Abstracts of Japan, vol. 1998, No. 14, Dec. 31, 1998, JP 10-249771, Sep. 22, 1998.
Patent Abstracts of Japan, vol. 015, No. 485, Dec. 9, 1991, JP 3-208525, Sep. 11, 1991.
Patent Abstracts of Japan, vol. 2002, No. 08 Aug. 5, 2002, JP 2002-120186, Apr. 23, 2002.

\* cited by examiner

*Primary Examiner*—Eileen D. Lillis
*Assistant Examiner*—M. Scott Lowe
(74) *Attorney, Agent, or Firm*—Foley & Lardner LLP

(57) ABSTRACT

A general purpose hand for a multiaxis manipulator which includes a suction holder. The suction holder includes: a suction pad to be sucked onto the handled object; an axially movable rod member supporting the suction pad as rotatable; a resilient member for pressing the suction pad toward the handled object; a first locking mechanism for locking axial movement of the rod member; and a second locking mechanism for locking rotation of the suction pad. The suction holder is slidably mounted on the frame member carried by the multiaxis manipulator.

9 Claims, 12 Drawing Sheets

GENERAL PURPOSE HAND FOR MULTIAXIS MANIPULATOR

BACKGROUND OF THE INVENTION

1. Field of the Invention

The present invention relates to a general purpose hand for gripping objects, particularly to a general purpose hand which can grip various kinds of objects different in size/shape.

2. Description of the Related Art

For a general industrial robot, there are many different kinds of end effectors which can be mounted on the robot's hand at the end of the robot's arm. Among the most common are grippers, such as gauge clamps, for holding, moving and releasing objects. The hand is usually provided with various kinds of grippers for various kinds of the objects, and a mechanism for changing the grippers according to the object to be handled.

SUMMARY OF THE INVENTION

In the above-mentioned robot's hand, since the specific gripper needs to be used for specific object, the number of grippers increases as the number of the products increases. With the increased number of grippers and the changing mechanisms, the hand increases in weight to exceed the capacity or permissible inertia of the robot's arm.

Further, grippers are retracted to their standby positions on the hand, when they are not in use. All the grippers and changing mechanisms, including the ones in their standby positions, must be arranged in a confined space of the hand, so as to avoid interference with the feed-in gauges or the feed-out gauges. This makes the structure of the hand more complex.

In consideration of the problem as described above, an object of the present invention is to provide a general purpose hand which can grip various kinds of objects without other grippers added.

An aspect of the present invention is a general purpose hand for a multiaxis manipulator for handling objects, comprising: a frame member to be carried by the multiaxis manipulator; and a suction holder which comprises: a suction pad to be sucked onto the handled object; a rod member for rotatably supporting the suction pad, the rod member being axially movable relative to the frame member; a resilient member for pressing the suction pad toward the handled object; a first locking mechanism for locking axial movement of the rod member; and a second locking mechanism for locking rotation of the suction pad, wherein the suction holder is slidably mounted on the frame member.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
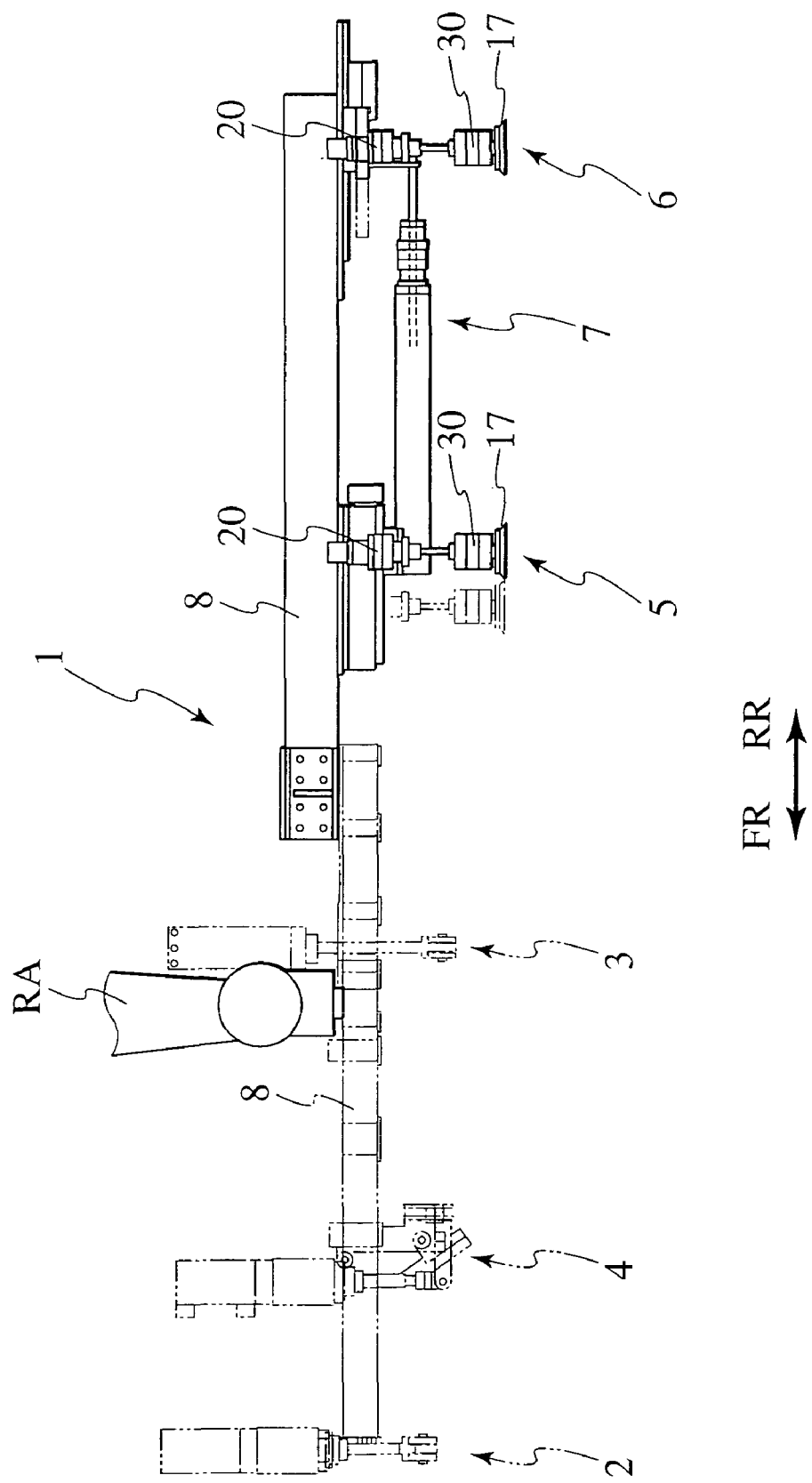
FIG. 1 is a plan view of a general purpose hand according to an embodiment of the present invention.

An embodiment of the present invention will be explained below with reference to the drawings, wherein like members are designated by like reference characters.

FIGS. 1 to 10 show a general purpose hand 1 as an embodiment of the present invention, for gripping a body side outer (referred to as B/S-OTR, hereinafter) of an automobile to be conveyed.

Figure 2:
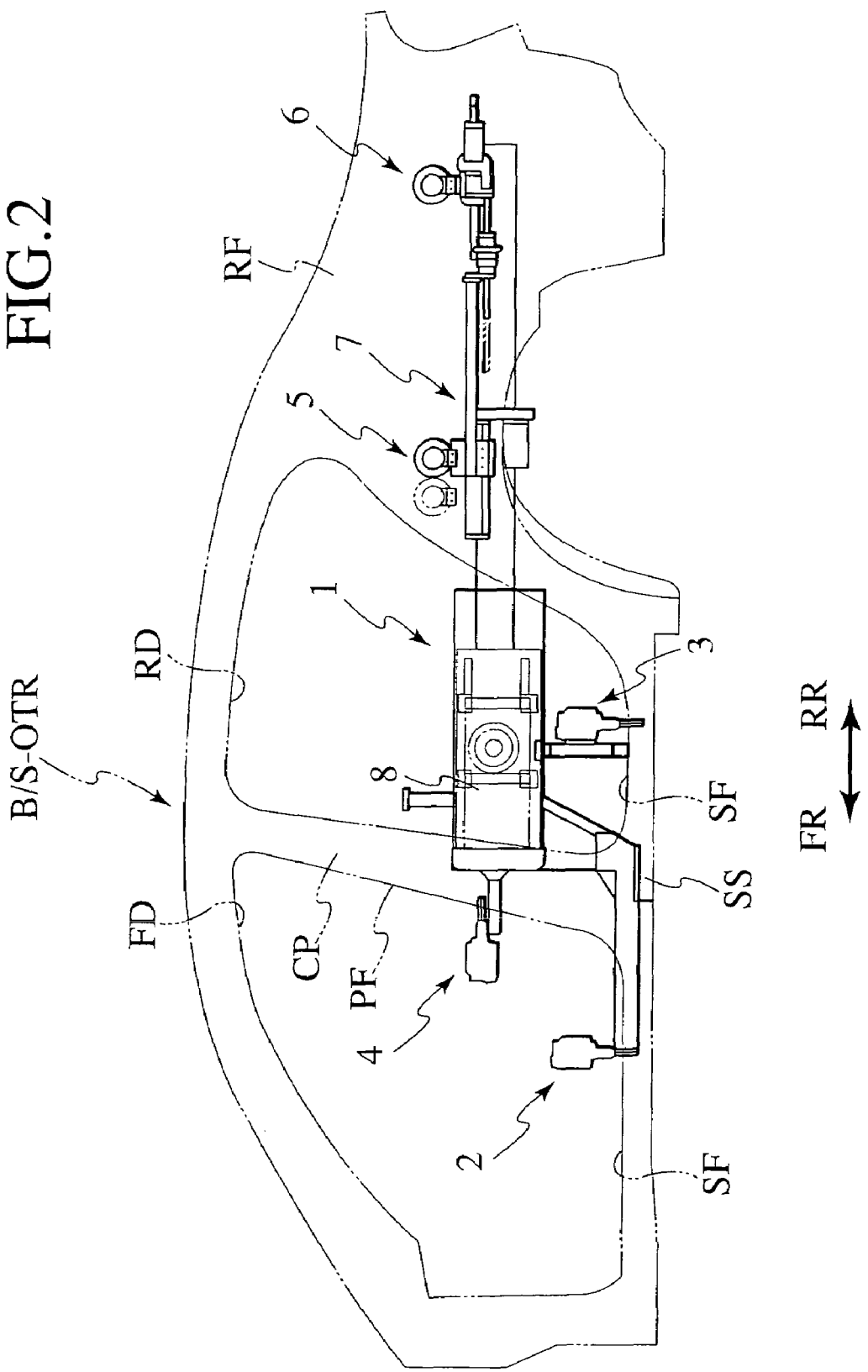
FIG. 2 is a front view of the general purpose hand.

As shown in FIGS. 1 and 2, on the B/S-OTR, a door opening FD is provided on its front side in a longitudinal direction of the B/S-OTR, and a door opening RD is provided on its rear side in the longitudinal direction. Along the lower side peripheries of the door openings FD and RD, a flange SF is formed to extend upward from an upper edge of a side sill SS which extends in the longitudinal direction below the openings FD and RD. Along the rear side periphery of the door opening FD, a flange PF is formed to extend frontward from a front edge of a center pillar CP which extends in a vertical direction between the door openings FD and RD. The B/S-OTR is formed to have a rear fender RF on its rear side in the longitudinal direction.

The general purpose hand 1 is constituted of gauge clamps 2 to 4, suction holders 5 and 6, a suction holder positioning device 7, and a frame 8 connected to a robot's arm RA, etc. The gauge clamps 2 to 4 are for clamping the flanges SF and PF. The suction holders 5 and 6 are for sucking on the inner surface of the rear fender RF. The suction holder positioning device 7 is for moving and positioning the suction holders 5 and 6 in the body longitudinal direction. The frame 8 connected to the robot's arm RA is for supporting and securing the gauge clamps 2 to 4 and the suction holders 5 and 6.

Figure 3:
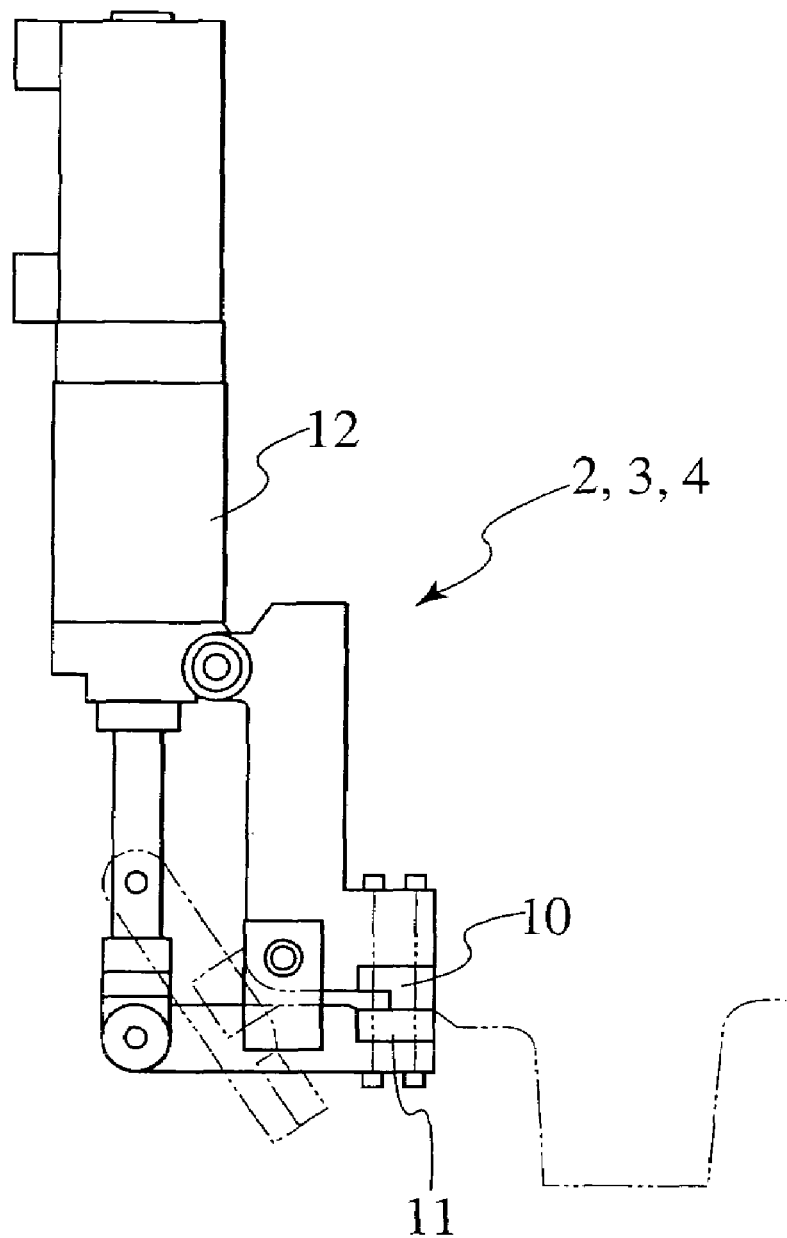
FIG. 3 is a side view of a gauge clamp of the general purpose hand.

As shown in FIG. 3, each of the gauge clamps 2 to 4 clamps the flange of the B/S-OTR, with its fixed jaw 10 and movable jaw 11, to hold the B/S-OTR. The fixed jaw 10 is supported on a bracket fixed to the frame 8. The movable jaw 11 is pivotally supported on the fixed jaw 10. A clamp cylinder 12 is provided to pivot the movable jaw 11 between an open position and a clamping position. As shown in FIG. 2, the gauge clamps 2 and 3 clamp the respective flanges SF of the side sill SS from inside of the door openings FD and RD. The fixed jaws 10 of the gauge clamps 2 and 3 are set so as to be vertical and substantially perpendicular to the edge of the longitudinally extending flange SF. The gauge clamp 4 clamps the flange PF of the center pillar CP. The fixed jaw 10 of the gauge clamp 4 is set to be horizontal and substantially perpendicular to the edge of the vertically extending flange PF. The flanges SF and PF are formed to have grip portions to be gripped by the gauge clamps 2 to 4, which are commonly arranged between different types or models of vehicles. Thus, the gauge clamps 2 to 4 need not change or adjust their positions each time the type or model of the handled vehicle is changed, and can be used commonly between different types or models of the vehicles, which include a variety of vehicles, from a compact sedan to a large-size sedan or from a compact wagon to a large-size wagon.

Figure 4:
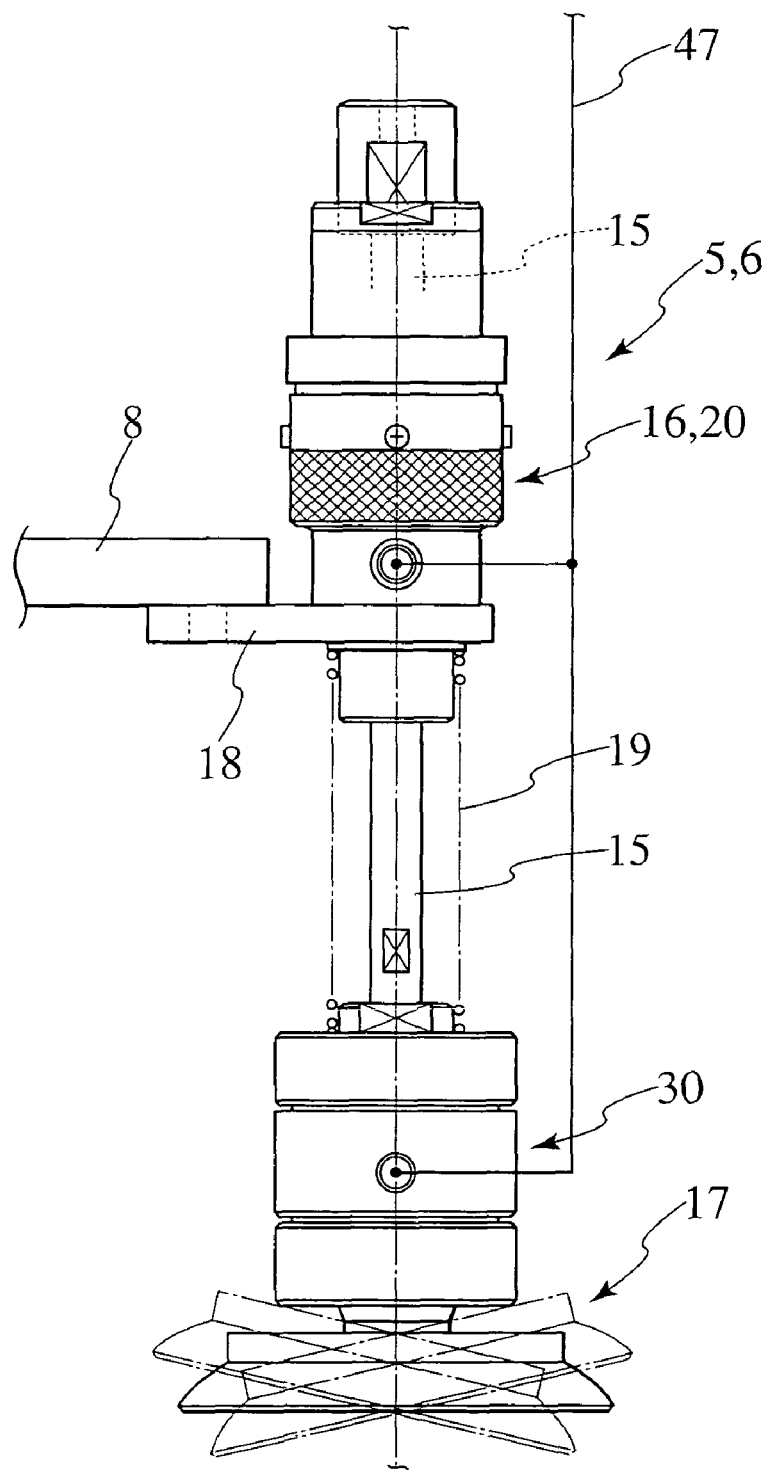
FIG. 4 is a side view of a suction holder of the general purpose hand.

As shown in FIG. 4, each of the suction holders 5 and 6 is constituted of a suction pad 17, a pad rotation lock unit 30, a hollow sliding rod arm 15, a sliding rod arm guide unit 16, and a pneumatic circuit 40, etc. The suction pad 17 is to be sucked onto the inner surface of the rear fender RF. The pad rotation lock unit 30 rotatably supports the suction pad 17 and locks the rotation thereof. The hollow sliding rod arm 15 supports on its end the suction pad 17 through the pad rotation lock unit 30. The sliding rod arm guide unit 16 includes a rod arm locking mechanism 20, which slidably supports the hollow sliding rod arm 15 and locks the sliding movement thereof. The pneumatic circuit 40 selectively supplies positive pressure to the rod arm locking mechanism 20 and the pad rotation lock unit 30, and negative pressure to the suction pad 17.

The suction pad 17 is formed to have, on its distal end, a ring-shaped contact face which is made softer than that of a base side portion thereof so as not to damage the surface of the object (work), such as a panel, to be sucked. The suction pad 17 is made of nitrile rubber (NBR) which is oil resistant polymer rubber generally used for an oil seal, an O-ring or the like. The quality/quantity of carbon contained in the polymer base is varied from the base side portion to the contact face portion of the suction pad 17 in order to obtain the optimum hardness distribution. Since the same polymer is used for both the base side portion and the contact face portion, the suction pad 17 is integrally vulcanized and both portions thereof can be chemically bonded. Thus, the suction pad 17 has excellent flexibility in the contact face and high rigidity in the base side portion.

Materials for the suction pad 17 are not limited to the above, but other rubber materials can be used as long as the suction pad is made so as to have a hardness which varies from the base side portion to the contact face portion. Preferable hardness of the suction pad 17 is, in durometer hardness HDA which can be obtained by a spring type hardness testing machine "Durometer" generally used for plastic or rubber materials, "40 to 50" at the contact face, and "60 to 70" at other portions including the base side portion.

Figure 6:
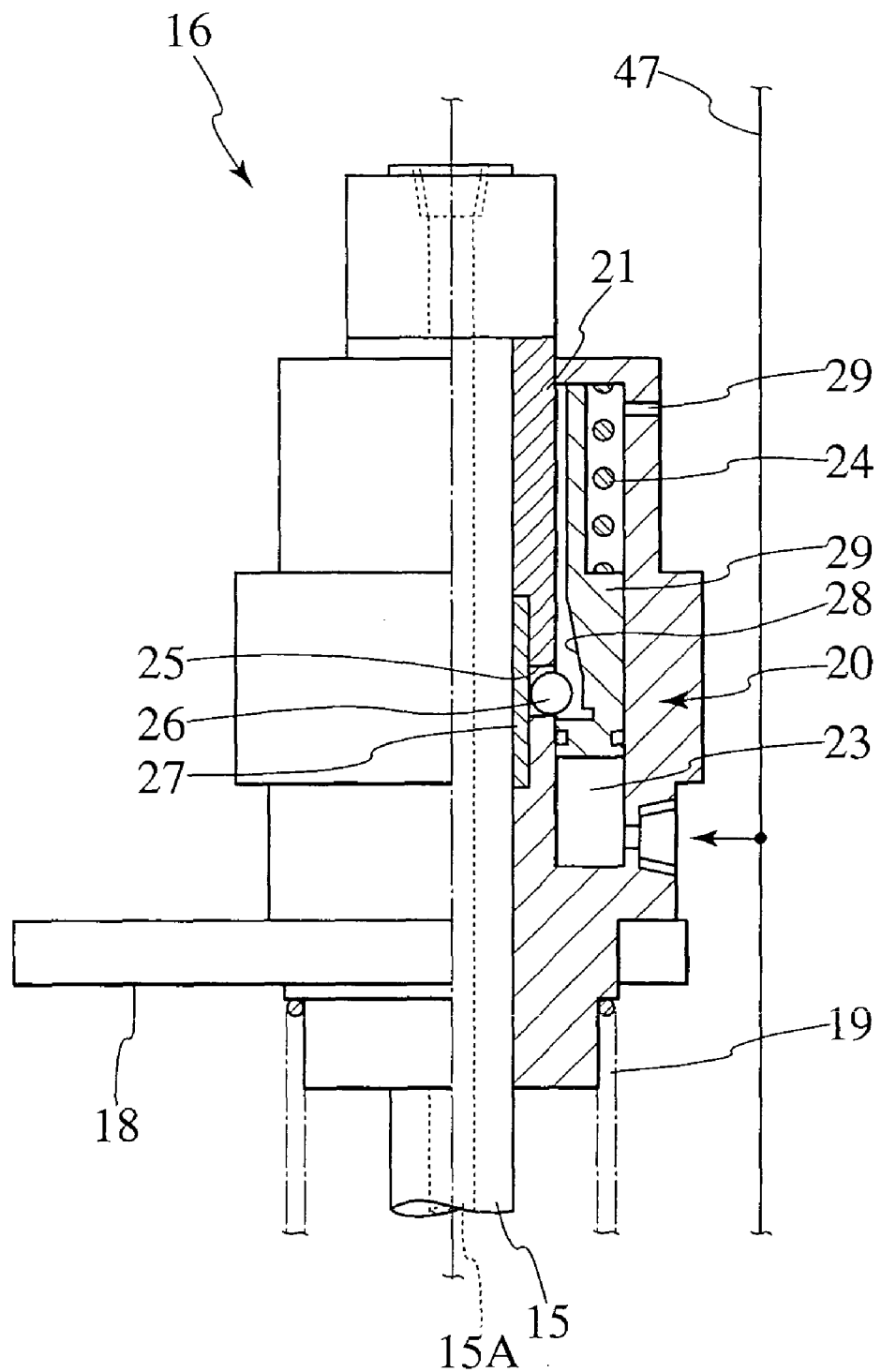
FIG. 6 is a partial sectional view of a sliding rod arm guide unit of the general purpose hand.
Figure 7:
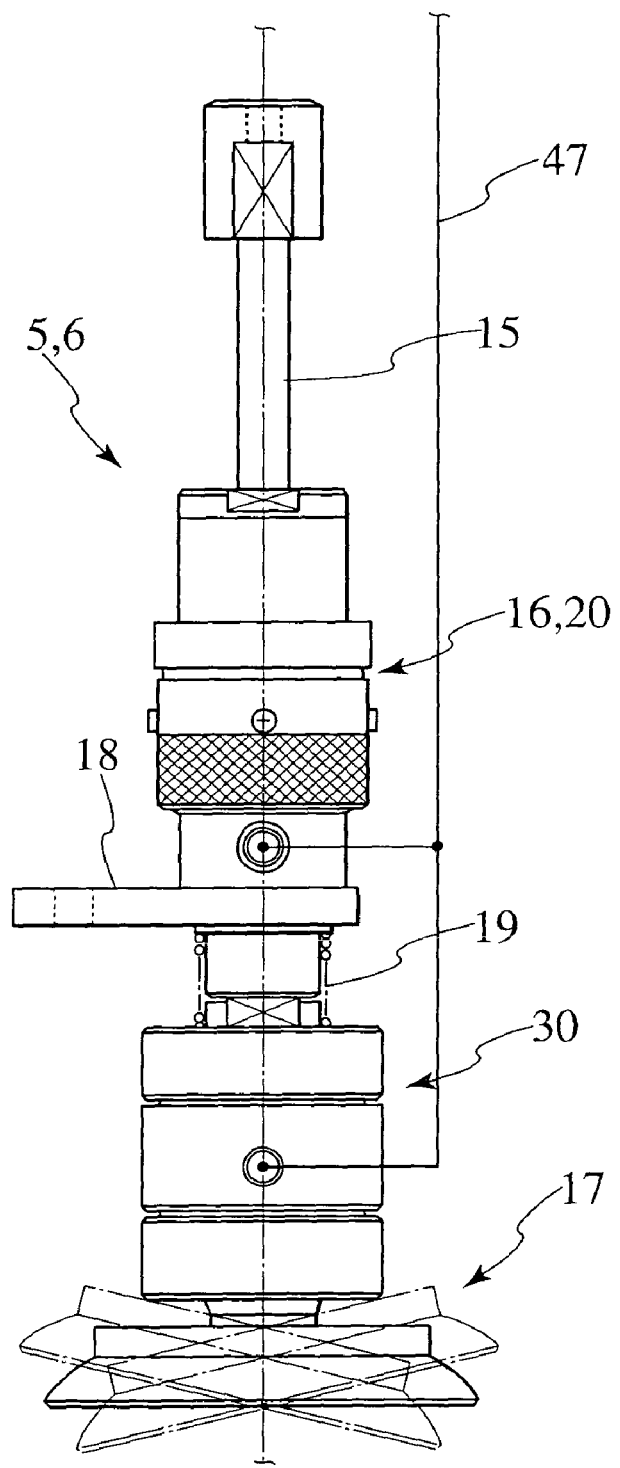
FIG. 7 is a side view of the suction holder set in a backward limit position.

The sliding rod arm guide unit 16 has, as shown in FIG. 6, a tubular guide 21 which slidably supports the hollow sliding rod arm 15 therein. The tubular guide 21 is held integrally with the bracket 18. Between the forward end of tubular guide 21 and the pad rotation lock unit 30, a coil spring 19 is provided around the hollow sliding rod arm 15 to push the pad rotation lock unit 30 and the suction pad 17 forward (advancing direction). FIG. 4 shows the suction pad 17 and the hollow sliding rod arm 15 set in a forward limit position. FIG. 7 shows the suction pad 17 and the hollow sliding rod arm 15 set in a backward limit position.

As shown in FIG. 6, the sliding rod arm guide unit 16 is provided with an annular space around the tubular guide 21, in which a tubular lock piston 22 can move in parallel to an axial direction of the hollow sliding rod arm 15. The tubular lock piston 22 slides on the radially outer surface of the tubular guide 21 and on the radially inner surface of the radially outer wall of the annular space. A part of the annular space in front of the tubular lock piston 22 constitutes a cylinder chamber 23 to which compressed air is supplied through the pneumatic circuit 40 via a hose connected to a supply port provided on the front portion of the sliding rod arm guide unit 16. In the annular space behind the tubular lock piston 22, a spring 24 is provided to push the tubular lock piston 22 forward. The tubular guide 21 is provided with a plurality of holes 25 penetrating therethrough in a radial direction. In each through-hole 25, a ball 26 is provided which is movable in the radial direction. A cylindrical brake shoe 27 is interposed between the hollow sliding rod arm 15 and the tubular guide 21. The ball 26 abuts on the brake shoe 27 from radially outside. The tubular lock piston 22 has, on its radially inner surface, a tapered cam lock surface 28 diverging toward the cylinder chamber 23. The tubular lock piston 22, the spring 24, the ball 26 and the brake shoe 27 constitute a rod arm locking mechanism 20. On the radially outer wall of the rear part of the annular space, where the spring 24 is provided, an air vent 29 is provided to keep the pressure thereof atmospheric.

In the rod arm locking mechanism 20, when the tubular lock piston 22 is forced to move forward toward the cylinder chamber 23 by the spring 24, the ball 26 in the through-hole 25 is pressed radially inward by the rear part of the cam lock surface 28 of the tubular lock piston 22, which has a smaller radius from an axis thereof. The brake shoe 27 is pressed toward the hollow sliding rod arm 15 by the ball 26 to put a brake on the hollow sliding rod arm 15. When compressed air is supplied to the cylinder chamber 23, the tubular lock piston 22 is forced to move rearward to its retreat position against the pressing force of the spring 24, whereby the ball 26 is released from the tapered cam lock surface 28. The brake shoe 27 is released from the ball 26, as is the hollow sliding rod arm 15 from the brake shoe 27. In this way, the tubular lock piston 22 functions as an unlocking means.

Figure 8:
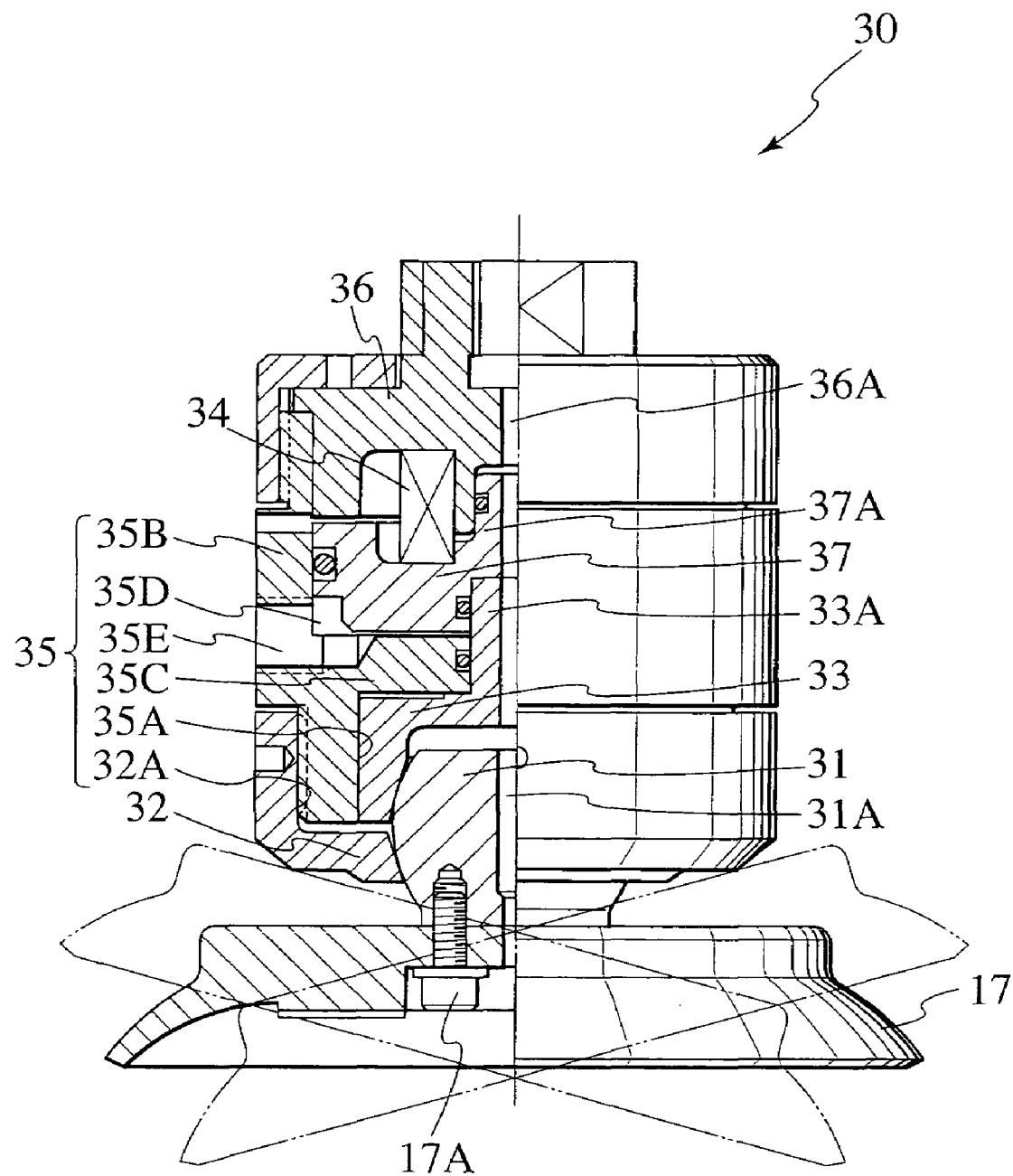
FIG. 8 is a partial sectional view of a pad rotation lock unit of the general purpose hand.

As shown in FIG. 8, the pad rotation lock unit 30 is constituted of a joint ball 31, a retainer cap 32, a movable cup 33, and a cylinder 35, etc. The joint ball 31 is fixed to the suction pad 17. The retainer cap 32 holds the joint ball 31 at the front side thereof (from the side of the suction pad 17). The movable cup 33 is pressed forward by a spring 34 to hold the joint ball 31 at the rear side thereof, and is moved backward to its retreat position by the cylinder 35.

The joint ball 31 is fixed through bolts 17A to the rear side of the suction pad 17. The joint ball 31 and the suction pad 17 are provided therethrough with an air passage 31A along their center axis. Air is removed through the passage 31A from the space between the pad 17 and the rear fender RF to thereby set negative pressure in the space, when the suction pad 17 is sucked onto the inner surface of the rear fender RF. The joint ball 31 is formed to have a spherical outer surface, which is kept in contact with the inner conical surfaces of the retainer cap 32 and the movable cup 33. In a state where the cylinder 35 is not actuated, the movable cup 33 is pressed forward by the spring 34, and the joint ball 31 is locked between the retainer cap 32 and the movable cup 33, whereby rotation of the suction pad 17 is locked. When the cylinder 35 is actuated, the movable cup 33 is moved away from the joint ball 31 to thereby release the joint ball 31 and allow rotation of the suction pad 17.

The cylinder 35 is provided on its front portion with a bore 35A in which the movable cup 33 is stored as movable in the axial direction, and on its radially outer surface of the front portion with an external thread 32A for fixing the retainer cap 32. The cylinder 35 has, on its rear side, a hollow cylindrical body 35B, which slidably and movably houses a ring-shaped piston 37 inside. The cylindrical body 35B has an opening in its rear, which is closed by an end plate 36 connected to the hollow sliding rod arm 15. The piston 37 is formed to have, on its center portion, a hollow boss 37A which axially extends rearward from the rear side of the center portion to be slidably fitted into the end plate 36. The piston 37 is connected to the cup 33 through a hollow rod 33A which axially extends rearward from the rear side of the center portion of the movable cup 33, whereby the piston 37 and the cup 33 can move together in the axial direction. The cylindrical body 35B is formed to have a flange 35C extending radially inward from the inner surface thereof. The flange 35C is provided on the center portion thereof with a bore into which the hollow rod 33A of the cup 33 is fitted so as to be slidable in the axial direction. A space between the inner surface of the cylindrical body 35B and an outer surface of the hollow rod 33A behind the flange 35C is a cylinder chamber 35D for the piston 37. The spring 34 is provided between the piston 37 and the end plate 36 to press the piston 37 forward. The end plate 36 is provided with an axially extending bore 36A on its center portion. The through-hole 15A of the hollow sliding rod arm 15, the bore 36A of the end plate 36, the bore of the hollow rod 33A, and the passage 31A of the joint ball 31 are brought into a line so as to form a continuous air passage which communicates the inner space of the suction pad 17 with the pneumatic circuit 40.

Compressed air as working fluid is supplied from the pneumatic circuit 40 through a port 35E provided on the cylindrical body 35B into the cylinder chamber 35D, when the cylinder 35 is actuated in synchronization with the rod arm locking mechanism 20. When the compressed air is not supplied to the cylinder chamber 35D, the pressing force of the spring 34 is applied through the hollow rod 33A of the piston 37 to the movable cup 33. The joint ball 31 is locked between the movable cup 33 and the retainer cap 32 to thereby set the suction pad 17 at an angle in a locked state where rotation thereof is locked. When the compressed air is supplied to the cylinder chamber 35D, the piston 37 is moved rearward against the force of the spring 34 whereby the movable cup 33 is moved away from the retainer cap 32 through the hollow rod 33A. The joint ball 31 is thus released and allowed to rotate, and the suction pad 17 is set in a released state where the suction pad 17 is allowed to freely rotate to an angle, for example, as shown in a double-dotted line in FIG. 8.

Figure 5:
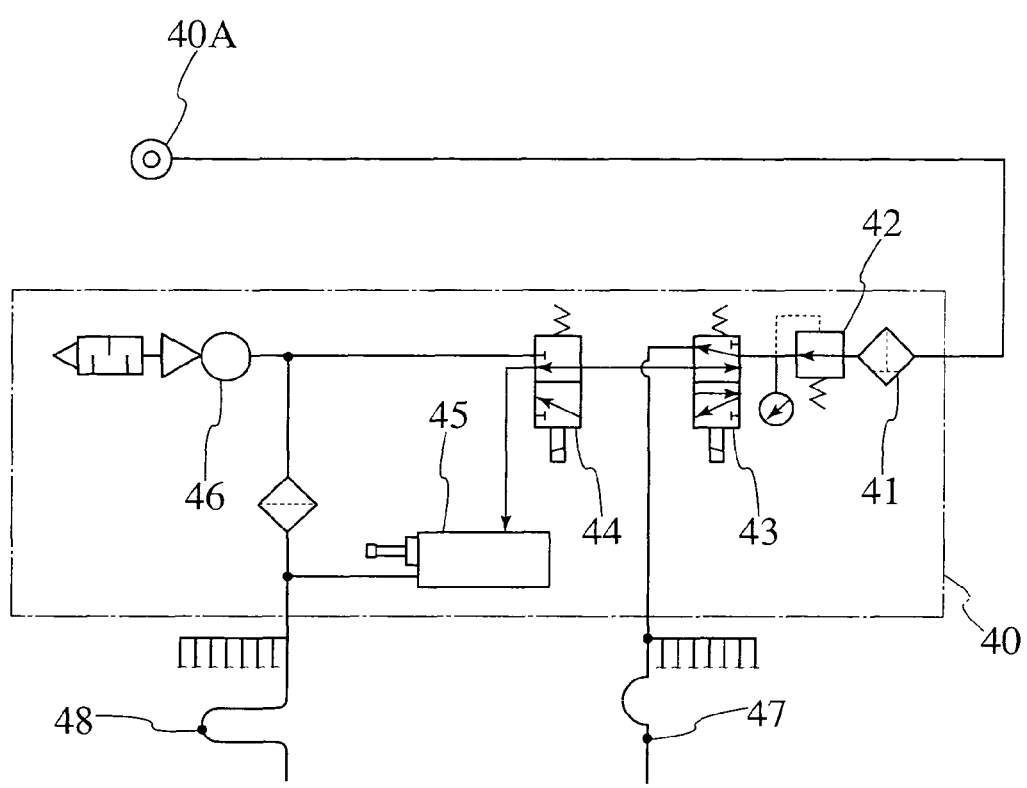
FIG. 5 is a schematic of a pneumatic circuit of the general purpose hand.

As shown in FIG. 5, a filter 41, a pressure regulator 42, a first solenoid valve 43, a second solenoid valve 44, an ejector 45, a venturi 46, etc. are included in the pneumatic circuit 40. When the first solenoid valve 43 is set in a first changing position, the compressed air from a pneumatic source 40A is supplied through parallel lines 47, which are respectively connected to the suction holders 5 and 6, to the cylinder chambers 23 and 35D, which are connected in parallel to the line 47, and a line to the second solenoid valve 44 is made open to an atmosphere. When the first solenoid valve 43 is operated and set in a second changing position, the compressed air is supplied from the pneumatic source 40A to the second solenoid valve 44, and the cylinder chambers 23 and 35D are made open through the line 47 to the atmosphere.

When the second solenoid valve 44 is set in a first changing position, the compressed air, which passed through the first solenoid valve 43, is supplied through the ejector 45 and parallel lines 48 to the suction pads 17. When the second solenoid valve 44 is operated and set in a second changing position, the compressed air is supplied to the venturi 46, and the venturi generates negative pressure. This negative pressure is introduced through the lines 48 into the suction pads 17. The ejector 45 stops supplying air when a predetermined amount of air is supplied to the suction pads 17.

While the first solenoid valve 43 is in the first changing position, the first and the second solenoid valves 43 and 44 keep the rod arm locking mechanism 20 and the pad rotation lock unit 30 in their released state where axial movement of the suction pad 17 together with the hollow sliding rod arm 15 and rotation of the suction pad 17 are enabled. While the first solenoid valve 43 is set in the second changing position, the rod arm locking mechanism 20 and the pad rotation lock unit 30 are put in their locked state where the axial movement of the suction pad 17 and its rotation are locked, and, positive or negative pressure can be introduced into the suction pad 17, in accordance with the position of the second solenoid valve 44. The second solenoid valve 44 and the venturi 46 thus function as suction means.

Figure 9:
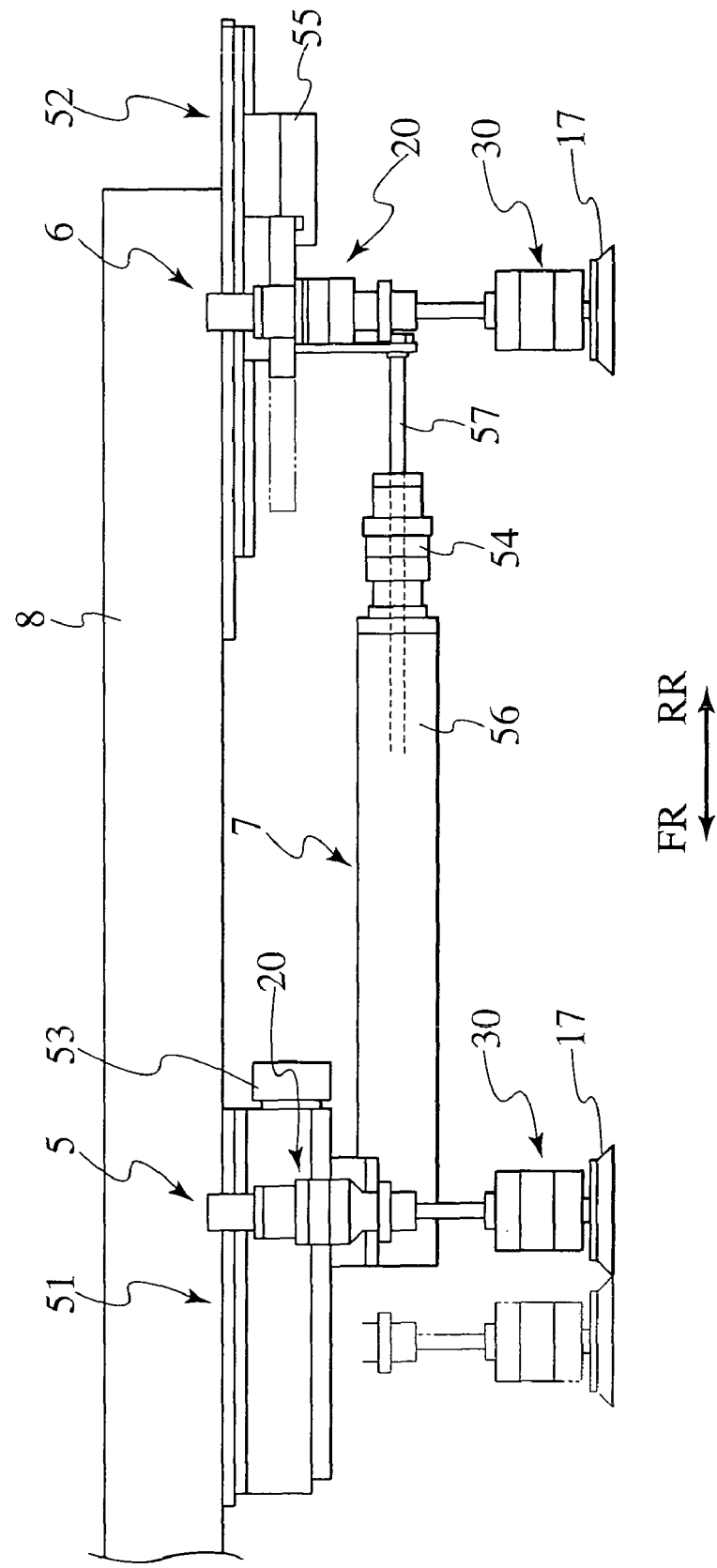
FIG. 9 is a plan view of a suction holder positioning device of the general purpose hand.
Figure 10:
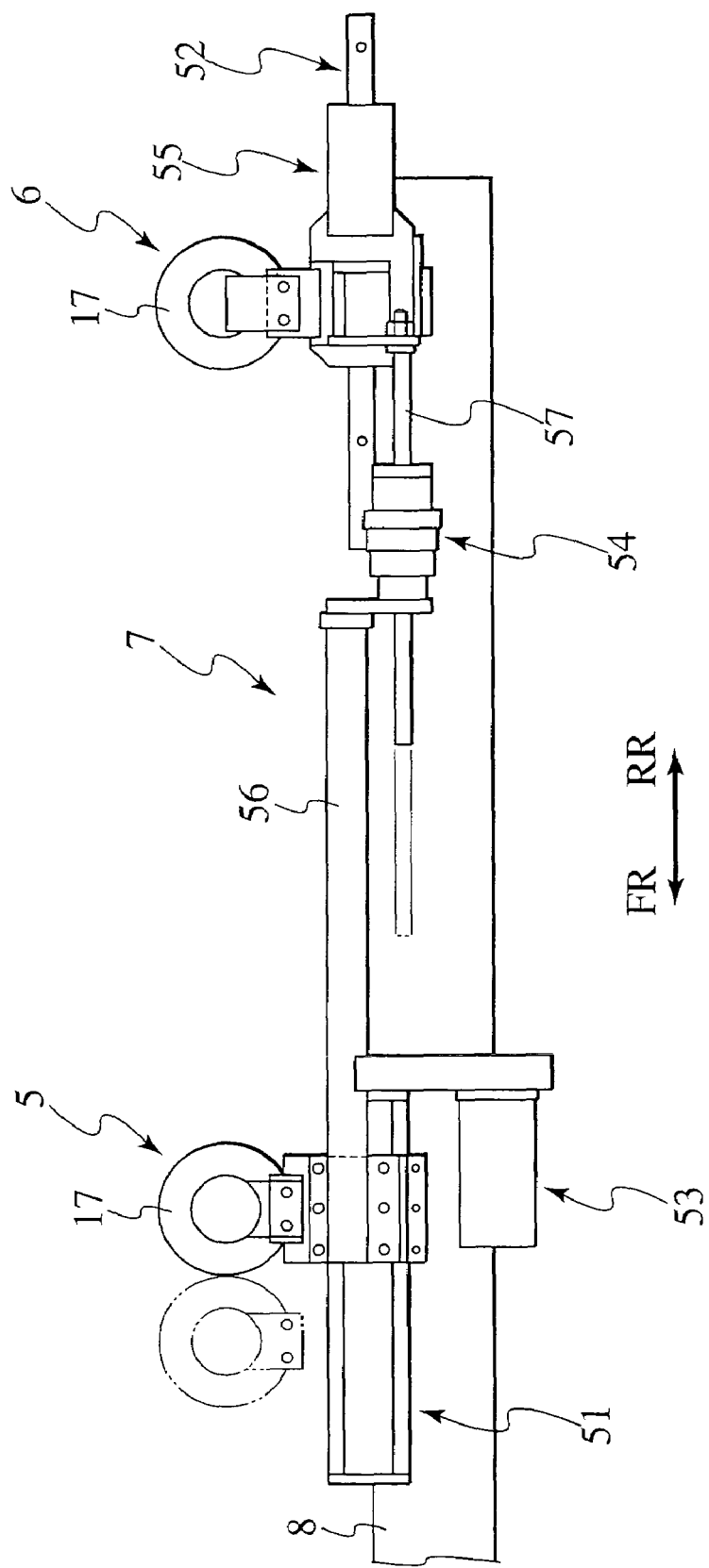
FIG. 10 is a front view of the suction holder positioning device.

The suction holder positioning device 7 enables movement of the suction holders 5 and 6 in the body longitudinal direction. As shown in FIGS. 9 and 10, the suction holders 5 and 6 are respectively supported by slide mount mechanisms 51 and 52 provided on the frame 8 extending in the body longitudinal direction.

In this embodiment, the two suction holders 5, 6 and the two slide mount mechanisms 51, 52 are arrayed on the frame 8. The first slide mount mechanism 51 on the front side in the body longitudinal direction is provided with a drive unit 53, by which the suction holder 5 is moved in the body longitudinal direction, as indicated by a solid line and a chain line in FIG. 9, and is adjusted to a proper position. The second slide mount mechanism 52 on the rear side in the body longitudinal direction is provided with a second brake unit 55 which locks the sliding movement of the suction holder 6 supported thereon. The suction holder 6 is locked when the second brake unit 55 is actuated, and is allowed to movably slide when the braking operation is released.

A spacing lock mechanism is provided between the first slide mount mechanism 51 and the second slide mount mechanism 52, and is constituted of a frame member 56, a rod member (rod material) 57, and a first brake unit 54, etc. The frame member 56 is extended from the first slide mount mechanism 51 toward the second slide mount mechanism 52. The rod member 57 is extended from the second slide mount mechanism toward the first slide mount mechanism 51. The members 56 and 57 are connected with each other at the first brake unit 54. The first brake unit 54 is provided on the frame member 56 to slidably support the rod member 57 and to lock relative movement thereof. The first brake unit 54 is set in released state while the second brake unit 55 is actuated, and is in actuated state while the second brake unit 55 is not actuated. With the first brake unit 54 in released state and the second brake unit 55 in actuated state, only the suction holder 5 can be moved by the drive unit 53 to slide on the first slide mount mechanism 51. With the first brake unit 54 in actuated state and the second brake unit 55 in released state, the suction holders 5 and 6 can be moved together by the drive unit 53 to slide on the slide mount mechanisms 51 and 52 respectively, with a distance therebetween maintained constant.

In the general purpose hand 1 constituted as described above, while waiting to hold an object, the gauge clamps 2 to 4 are set open with the movable jaws 11 thereof pivoted away from the fixed jaws 10 thereof by the clamp cylinders 12. The compressed air is supplied to the respective rod arm locking mechanisms 20 to release the hollow sliding rod arms 15. Each of the hollow sliding rod arms 15 is thus pressed forward by the spring 19 to its forward limit position. The compressed air is also supplied to the respective pad rotation lock units 30 to release the suction pads 17. The compressed air is supplied to the cylinder chamber 35D of each of the pad rotation lock units 30, the piston 37 thereof is moved backward against the spring 34, and the movable cup 33 is brought into soft contact with the surface of the joint ball 31 or moved slightly away from the joint ball 31 to permit a rotational slide of the joint ball 31 between the retainer cap 32 and the movable cup 33. Each of the suction pads 17 is thus free to rotate.

Figure 11:
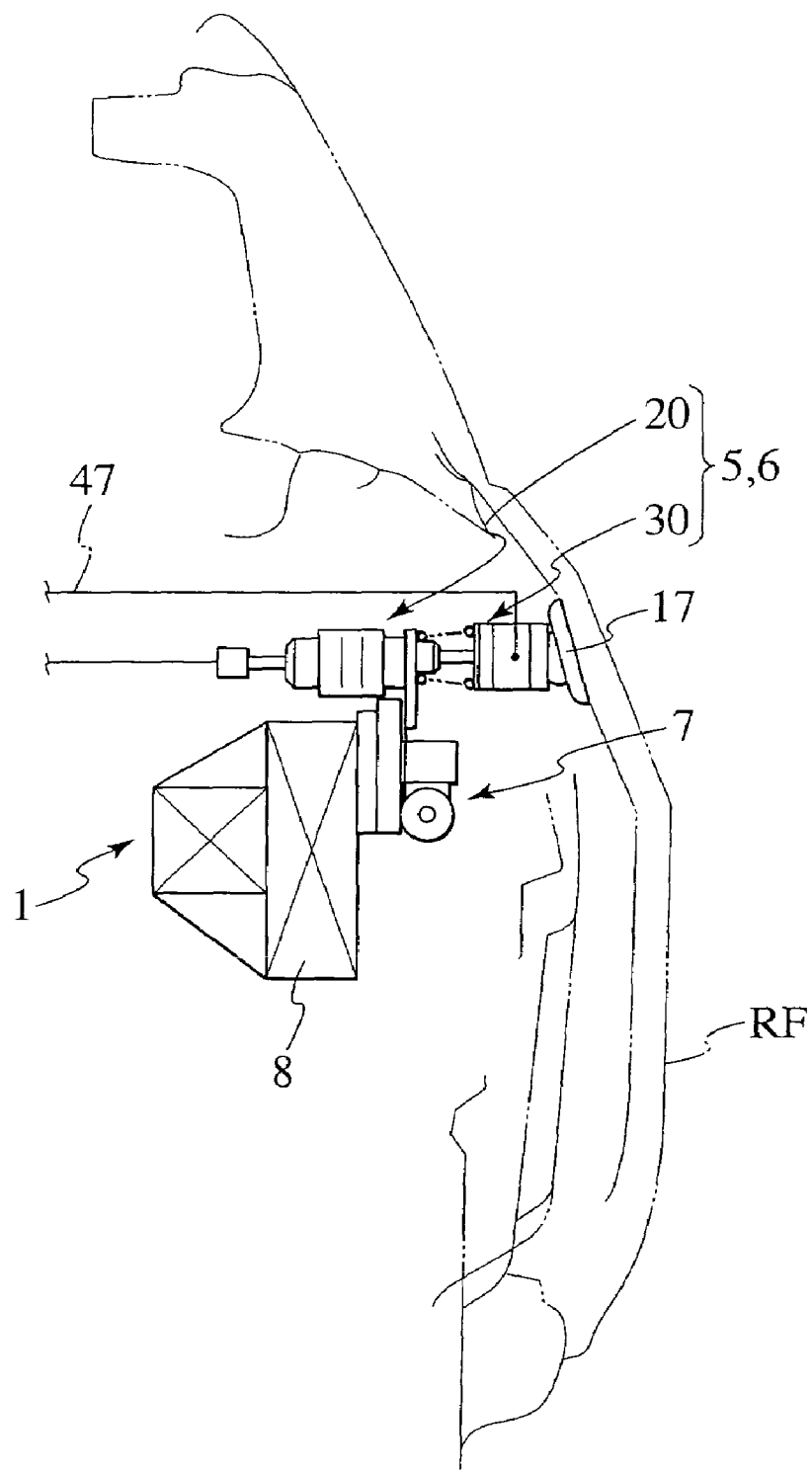
FIG. 11 is a side view showing the suction holder fitted on an inner surface of a body side outer.

When the frame 8 is moved by the robot's arm (not-shown), and the general purpose hand 1 is positioned in front of the B/S-OTR as an object held in a fed-in gauge (not shown), the fixed jaws 10 of the gauge clamps 2 to 4 are abutted on the side faces of the flange SF of the side sill SS and the flange PF of the center pillar CP (see FIG. 2), and the contact faces of the suction pads 17 are abutted on the inner surface of the rear fender RF (see FIG. 2). A rotation angle of each of the suction pad 17 is automatically adjusted in accordance with the inclination of the inner surface of the rear fender RF, and the axial position of each of the hollow sliding rod arms 15 is also adjusted automatically in accordance with the shape of the inner surface of the rear fender RF (see FIG. 11). All the suction pads 17 are thus in a state where the ring-shaped contact faces thereof are tightly fitted to the inner surface (object surface) of the rear fender RF.

In this state, the clamp cylinders 12 are actuated to close the gauge clamps 2 to 4, the air supplied to the rod arm locking mechanisms 20 and the pad rotation lock units 30 are released to the atmosphere, and negative pressure is introduced into the suction pads 17. Each of the gauge clamps 2 to 4 clamps the corresponding flange by the fixed jaw 10 and the movable jaw 11. Each of the rod arm locking mechanisms 20 locks movement of the hollow sliding rod arm 15. In each of the pad rotation lock units 30, the piston 37 and the movable cup 33 are moved forward to the retainer cap 32 by the pressing force of the spring 34, and lock rotation of the joint ball 31, to thereby lock rotation of the suction pad 17. The suction pads 17 suck onto and hold the object. Air is sucked through the through-hole 15A of the hollow sliding rod arm 15, the bore 36A of the end plate 36, the bores of the piston 37 and the hollow rod 33A, and the passage 31A of the joint ball 31 which communicate each other, and negative pressure is introduced to the space between each of the suction pads 17 and the object surface.

In this state, each of the suction pads 17 is rotated by imitating the object shape, fixed in a state where the ring-shaped contact face on its distal end is tightly fitted to the object's inner surface, and the hollow sliding rod arm 15 is also locked in the slid axial position by imitating the object shape. The object can be conveyed while its posture of being held in the feed-out gauge is maintained, and transferred to the feed-out gauge.

If a vehicle type or model to be handled is changed, a position and/or a length of the rear fender RF are changed, and positions of the part of the object to be sucked by the suction pad 17 are thus changed. The suction holders 5 and 6 can be moved in the body longitudinal direction by the slide mount mechanisms 51 and 52 of the suction holder positioning device 7 to proper positions to the vehicle type or model to be handled. Drive units may be respectively provided on the first slide mount mechanism 51 and the second slide mount mechanism 52. This makes the slide mount mechanisms 51 and 52 independently movable. The drive units need to be designed taking the stroke of the slide mount mechanisms 51 and 52 into consideration.

The suction holder positioning device 7 shown in FIGS. 9 and 10, employs a structure in which the drive unit 53 is provided only on the first slide mount mechanism 51 while no drive units are provided on the second slide mount mechanism 52, and sliding movement is made by the operation of the first slide mount mechanism 51. An operation of the suction holder positioning device 7 will be described hereinafter.

Figure 12:
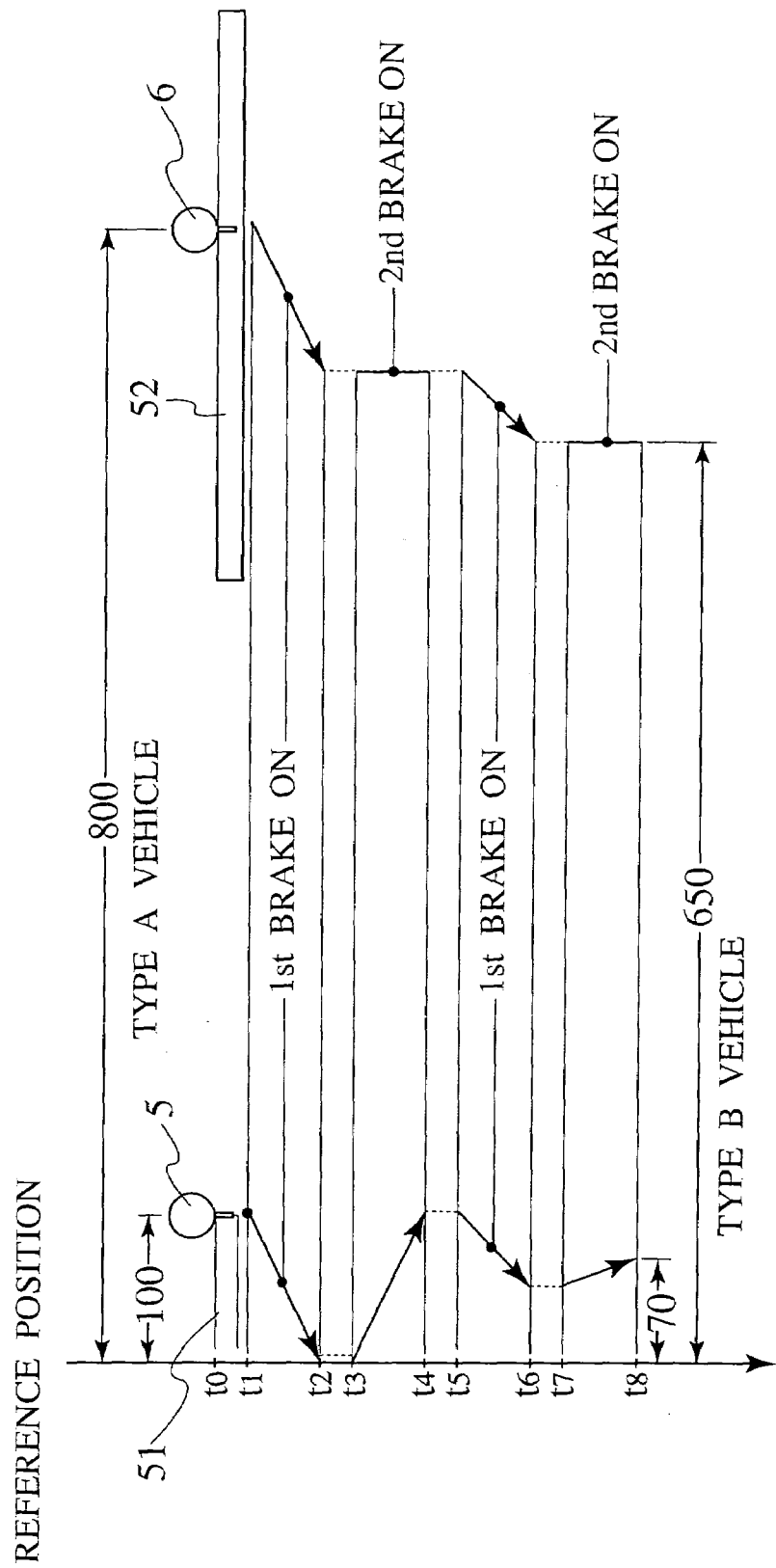
FIG. 12 is a time chart explaining an operation of the suction holder positioning device.

As shown in FIG. 12, it is assumed that the strokes of the first slide mount mechanism 51 and the second slide mount mechanism 52 are set to, e.g., 100 mm and 400 mm respectively. For a type A vehicle, the suction holders 5 and 6 of the first slide mount mechanism 51 and the second slide mount mechanism 52 must be positioned 100 mm and 800 mm from reference position of the first slide mount mechanism 51; 70 mm and 650 mm from the reference position of the first slide mount mechanism 51 for a type B vehicle. Further, for a type C vehicle, they must be positioned 50 mm and 850 mm from the reference position. Now, description will be made of a case where, after the B/S-OTR of the type A vehicle is handled, the B/S-OTR of the type B vehicle needs to be handled.

Immediately after the handling of the type A vehicle, the suction holders 5 and 6 are positioned 100 mm and 800 mm from the reference position (time t0). From these positions, the suction holder 5 must approach the reference position by 30 mm, and the suction holder 6 by 150 mm.

First, the first brake unit 54 is actuated, the second brake unit 55 is released, and the suction holders 5 and 6 can be slid integrally.

Second, the first slide mount mechanism 51 is actuated to move the suction holder 5 with the suction holder 6 frontward to the reference position side by 100 mm, which is a maximum stroke of the first slide mount mechanism 51. Thus (time t1 to t2), the suction holder 5 is positioned in the reference position, and the suction holder 6 is positioned in a position 700 mm from the reference position.

Third, the first brake unit 54 is released, and the second brake unit 55 is actuated to lock the suction holder 6, thereby enabling movement of only the suction holder 5. In this state, the first slide mount mechanism 51 is actuated to move only the suction holder 5 from the reference position rearward by 100 mm (time t3 to t4). During this movement called an empty movement, only the suction holder 5 is moved.

Fourth, the first brake unit 54 is actuated to release the operation of the second brake unit 55, and the first slide mount mechanism 51 is actuated to move the suction holder 5 together with the suction holder 6 frontward by 50 mm (time t5 to t6). At this point of time (t6), the suction holders 5 and 6 are positioned 50 mm, 650 mm from the reference position.

Then, the first brake unit 54 is released, and the second brake unit 55 is actuated for the first slide mount mechanism 51 to move the suction holder 5 rearward from the reference position by 20 mm. Since the movement of the suction holder 6 is blocked by the second brake unit 55, only the suction holder 5 is moved from the reference position by 20 mm (time t7 to t8).

By the foregoing operation, the suction holders 5 and 6 are positioned 70 mm and 650 mm from the reference position, and arranged in optimal positions for the suction pad 17 to hold the type B vehicle.

The number of times of operations of the first slide mount mechanism 51, the first and the second brake units 54 and 55 is changed depending on the maximum strokes of the first and second slide mount mechanisms 51 and 52 and the positional relations of the suction pads 17 between the current positions and the next positions thereof. The number of empty movements can be reduced as the maximum stroke of the first slide mount mechanism 51 becomes longer, while the shorter the stroke becomes, the more movements occur. On the other hand, with a shorter stroke of the first slide mount mechanism 51, the drive unit 53 can be compact, thus saving the weight thereof on the frame 8.

Position changes from the type B vehicle to the type A vehicle, type A to type C, type C to type A, type B to type C, and type C to type B can be similarly made. By storing the positions and the operations in an unused axis control program of the robot, e.g., a seventh axis control program, the positions of the suction pads 17 can be automatically adjusted correspondingly to the kinds of fed-in B/S-OTRs.

The embodiment provides the following advantages.

(1) In the embodiment, each of the suction holders 5 and 6 supports the suction pad 17 as axially movable, pressed forward relative to the frame 8, and freely rotatable, and includes the rod arm locking mechanism 20 and the pad rotation lock unit 30 to lock the rotation angle and axial position of the suction pad 17 when sucking to hold the B/S-OTR. The suction holders 5 and 6 are mounted as slidable relative to the frame 8 which is positioned and/or carried by the robot's arm RA as a multiaxis handling manipulator.

Thus, the suction pad 17 automatically adjust its axial position and rotation angle to the shape of the object, and securely holds any kinds of objects different in size/shape. The suction pad 17 can be used in general purpose applications.

This eliminates the necessity to install additional gauge clamps specially arranged for various kinds of objects. The weight of the hand is thus saved even in an application where the different kinds of objects need to be selectively handled.

(2) The suction holders 5 and 6 on the frame 8 are respectively slidably mounted on the first slide mount mechanism 51 which functions as a drive axis of the suction holder 5, and the second slide mount mechanism 52 which functions as a driven axis to allow sliding movement of the suction holder 6 together with the moving suction holder 5. Only the drive axis, specifically the drive unit 53 of the first slide mount mechanism 51, is controlled by the previously unused robot axis controller.

Positions of the two suction pads 17 are thus adjusted by single drive unit 53, which is controlled by, e.g., the seventh axis controller of the robot. This eliminates the necessity to install a controller dedicated to the drive axis, thus saving cost/weight.

(3) The suction holders 5 and 6 are connected with each other via the first brake unit 54 of the spacing lock mechanism which locks the relative movement of the suction holders 5 and 6. There is provided, on the suction holder 6, the second brake unit 55 which is actuated while the first brake unit 54 is released, or released while the first brake unit 54 locks the spacing between the suction holders 5 and 6. The suction holders 5 and 6 slide together when the first brake unit 54 is actuated, and only the suction holder 5 can slide when the first brake unit 54 is released.

Thus, the positions of the suction holders 5 and 6 can be adjusted by repeating the actuation and releasing the first and second brake units 54 and 55 associated with the reciprocating movement of the suction holder 5, and the stroke of the slide mount mechanism 51 for the suction holder 5 can be shortened, whereby the drive unit 53 and the slide mount mechanisms 51 and 52 can be reduced in cost/weight.

(4) The object to be handled is a body side outer panel B/S-OTR with the rear fender RF, provided with the front and rear door openings. The general purpose hand 1 includes the gauge clamps 2 to 4 for gripping the flanges SF and PF provided on the periphery of the front and rear door openings, and the suction holders 5 and 6 with the suction pads 17 for sucking onto the inner surface of the rear fender RF.

Thus, the general purpose hand 1 can be used commonly between the different types or models of vehicles, as long as the B/S-OTRs of the vehicles are formed so as to have the grip portions of the flanges SF and PF, identically positioned between the different vehicles, and the suction holders 5 and 6 are set to follow differences in the shape of the rear fenders RF. The structure of the hand 1 can be greatly simplified, and the weight thereof is greatly reduced.

The preferred embodiment described herein is illustrative and not restrictive, and the invention may be practiced or embodied in other ways without departing from the spirit or essential character thereof.

The general purpose hand 1 has two suction holders 5 and 6, respectively provided with one suction pad 17. However, though not shown, the hand 1 may include one slidable suction holder in combination with other gauge clamps, three or more suction holders with some slidable ones, or a plurality of suction holders and no gauge clamps with (a) certain suction holder(s) slidably adjustable depending on the handled object.

Furthermore, the embodiment has been described based on the general purpose hand 1 for handling the body side outer panel B/S-OTR as the object. However, the invention can be applied to a hand for handling other objects shaped in panel or block.

The scope of the invention being indicated by the claims, and all variations which come within the meaning of claims are intended to be embraced herein.

The present disclosure relates to subject matter contained in Japanese Patent Application No. 2002-257511, filed on Sep. 3, 2002, the disclosure of which is expressly incorporated herein by reference in its entirety.

What is claimed is:

1. A general purpose hand for a multiaxis manipulator for handling objects, comprising:
   a frame member mounted to an arm of the multiaxis manipulator; and
   a suction holder supported on the frame member and operative to move relative to the frame member, the suction holder comprising:
   a suction pad to be sucked onto the handled object;
   a rod member for rotatably supporting the suction pad, the rod member being axially movable relative to the frame member;
   a resilient member for pressing the suction pad toward the handled object;
   a first locking mechanism for locking axial movement of the rod member, the first locking mechanism comprising a ball member guided to move toward the rod member, a brake shoe interposed between the ball member and a lateral side of the rod member, and a piston member having a tapered surface to press the ball member against the brake shoe to thereby press the brake shoe against the rod member; and
   a second locking mechanism for locking rotation of the suction pad.

2. The general purpose hand according to claim 1, further comprising:
   a plurality of first and second suction holders provided on the frame;
   a first axis in which the first suction holder is moved to slide; and a second axis in which the second suction holder is allowed to slide together with the first suction holder, wherein the first axis is controlled by an axis controller of the multiaxis manipulator.

3. The general purpose hand according to claim 2, wherein the first and second suction holders are linked by a third locking mechanism for locking spacing between the first and second suction holders, and the second suction holder is provided with a brake unit which is actuated when the third locking mechanism is not actuated, and released when the third locking mechanism is actuated, and wherein the first and second suction holders are slidable together with each other while the third locking mechanism is actuated, and merely the first suction holder is slidable while the third locking mechanism is not actuated.

4. The general purpose hand according to claim 1, wherein the rod member is hollow through which negative pressure is introduced to the suction pad.

5. The general purpose hand according to claim 1, wherein the second locking mechanism comprises a spherical member fixed to the suction pad, first and second contact members to be pressed toward each other against the spherical member therebetween, a cylinder having a piston connected to the first contact member and a cylinder body fixed to the second contact member.

6. The general purpose hand according to claim 5, wherein the spherical member, the first contact member and the piston of the cylinder are hollow through which negative pressure is introduced to the suction pad.

7. The general purpose hand according to claim 1, further comprising:

a plurality of the suction holders operative to move closer to and away from each other.

8. A general purpose hand for a multiaxis manipulator which handles a body side outer including a rear fender, the body side outer being provided with a door opening, the hand comprising:

a frame member mounted to an arm of the multiaxis manipulator;

a gauge clamp supported on the frame member, for gripping a flange provided around the door opening of the body side outer; and a suction holder for holding the rear fender of the body side outer, supported on the frame member and operative to move relative to the frame member, the suction holder comprising:

a suction pad to be sucked onto an inner surface of the rear fender;

a rod member for rotatably supporting the suction pad, the rod member being axially movable relative to the frame member;

a resilient member for pressing the suction pad toward the body side outer;

a first locking mechanism for locking axial movement of the rod member, the first locking mechanism comprising a ball member guided to move toward the rod member, a brake shoe interposed between the ball member and a lateral side of the rod member, and a piston member having a tapered surface to press the ball member against the brake shoe to thereby press the brake shoe against the rod member; and a second locking mechanism for locking rotation of the suction pad.

9. A general purpose hand for a multiaxis manipulator for handling objects, comprising:

a frame member mounted to an arm of the multiaxis manipulator; and a holding means supported on the frame member and operative to move relative to the frame member, the holding means comprising:

a suction pad to be sucked onto the handled object;

a rod member for rotatably supporting the suction pad, the rod member being axially movable relative to the frame member;

a resilient member for pressing the suction pad toward the handled object;

a first locking mechanism for locking axial movement of the rod member, the first locking mechanism comprising a ball member guided to move toward the rod member, a brake shoe interposed between the ball member and a lateral side of the rod member, and a piston member having a tapered surface to press the ball member against the brake shoe to thereby press the brake shoe against the rod member; and a second locking mechanism for locking rotation of the suction pad.

* * * * *